(12) United States Patent
Heim (10) Patent No.: US 9,212,649 B2
(45) Date of Patent: Dec. 15, 2015

(54) WAVE ENERGY CONVERTOR

(71) Applicant: John J. Heim, Malta, NY (US)

(72) Inventor: John J. Heim, Malta, NY (US)

(*) Notice: Subject to any disclaimer, the term of this patent is extended or adjusted under 35 U.S.C. 154(b) by 0 days.

(21) Appl. No.: 14/480,997

(22) Filed: Sep. 9, 2014

(65) Prior Publication Data

US 2015/0069761 A1    Mar. 12, 2015

Related U.S. Application Data

(60) Provisional application No. 61/875,331, filed on Sep. 9, 2013.

(51) Int. Cl.
*F03B 13/18* (2006.01)

(52) U.S. Cl.
CPC ..... *F03B 13/1815* (2013.01); *F05B 2260/4021* (2013.01)

(58) Field of Classification Search
CPC .................................................. F03B 13/1815
USPC ........................................................... 290/53
See application file for complete search history.

(56) References Cited

U.S. PATENT DOCUMENTS

| | | | | |
|---|---|---|---|---|
| 1,968,235 | A  * | 7/1934 | Webber | 60/506 |
| 6,711,897 | B2 * | 3/2004 | Lee | 60/507 |
| 7,735,319 | B2 * | 6/2010 | Vukovic | 60/500 |
| 7,791,213 | B2 * | 9/2010 | Patterson | 290/53 |
| 7,891,183 | B2 * | 2/2011 | Al-Huwaider | 60/498 |
| 2011/0031750 | A1 * | 2/2011 | Kreissig | 290/53 |

FOREIGN PATENT DOCUMENTS

JP        09060572 A  *  3/1997  ............. F03B 13/18

* cited by examiner

*Primary Examiner* — Joseph Waks (57) ABSTRACT

A wave energy convertor utilizes reciprocating rotational motion of a float and float arm caused by repeated wave action to drive an electrical generator in order to produce electricity. A mount is anchored into an area of water experiencing wave action. A pulley support frame is connected to the mount. A float arm is lifted repeatedly by waves, producing rotational motion on an input axle. At least one pulley system transfers power from the input axle to an output axle connected to the electrical generator. The at least one pulley system multiplies the input rotation through mechanical advantage into a much faster angular speed at the output axle. A ratchet gear disengages influence of the float arm on the system on the downstroke. A flywheel stores rotational energy in order to maintain stable rotational rate on the downstroke.

20 Claims, 6 Drawing Sheets

WAVE ENERGY CONVERTOR

The current application claims a priority to the U.S. Provisional Patent application Ser. No. 61/875,331 filed on Sep. 9, 2013.

FIELD OF THE INVENTION

The present invention relates generally to electricity generation. More particularly, the present invention relates to converting wave energy into electric power.

BACKGROUND OF THE INVENTION

For those who live on islands in oceans or islands within lakes large enough to have reasonably constant wind, or shorelines without access to electricity, the invention uses the nearby water's waves to turn an alternator driveshaft, generating electricity. Most wave energy convertors (hereinafter referred as WECs or WEC) on the market are far too complex, requiring sophisticated technical skill on the individual builder's and manufacturers' parts. They tend to be expensive, and are not sized small enough for economical access by individual homeowners, especially those of limited means, such as third world residents living near water, but without access to electric power. It is therefore an object of the present invention to provide a wave energy convertor device which is low-tech and inexpensive. The present invention is extremely inexpensive: it costs about $500 plus float costs to build and construction, which requires no special skills The materials comprising the present invention are easily available worldwide. In addition, the present invention is easily portable, and is easily adjustable for different water levels and wave height, and automatically adjusts for tidal changes.

The present invention is far cheaper and easier to construct from off-the-shelf items than any existing WEC system. Unlike other WEC systems, it requires no special technical expertise to construct. Unlike any existing WEC systems, the present invention is inexpensive enough to be affordable by individual households of modest means, yet produce substantial electricity. No existing system is easily portable from site to site as needed. No other system uses leverage of float arm to minimize wave size needed to generate sufficient energy to turn alternator shaft at sufficient rpm's to produce considerable electric energy. No other system is so easily adjustable to water level and wave height.

Other devices are too technically sophisticated for most individuals to be able to construct for household use. Generally, components are not simple, "off the shelf" items readily available almost anywhere. Since developed for large scale applications, price of other devices is prohibitive for individuals who need to provide their own electrical energy. Other systems are not easily broken into 2 parts and transported to where needed. Other systems do not use float arm to leverage upward the mechanical power of waves at point it is used to turn gears that accelerate alternator rpm's to required levels. Some do not use flywheels to even out power delivery.

It is therefore an object of the present invention to provide a wave energy converter system that utilizes a float arm to turn an electrical generator which is cheap, portable, and adjustable.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention is a wave energy convertor device which can be easily assembled and installed by an individual with average or limited knowledge of electrical generation. The present invention utilizes reciprocating motion of a float caused by repeated wave action on the float in order to power an electrical generator, and is designed for small-scale, individual use in generally shallow water which typically experiences continual wave action, such as the beach of an ocean, sea or lake. The preferred embodiment of the present invention utilizes mechanical advantage to convert one upstroke of the float into 25 turns of an alternator drive shaft. A wave frequency of slightly over five waves per minute would produce several hundred watts of light at 12 volts using a low speed driveshaft alternator.

Referring to FIGS. 1-4, the present invention generally comprises a mount 1, a pulley support frame 2, a float 3, a float arm 4, at least one pulley system 5, a ratchet gear 6, an input axle 7, an output axle 9, and an electrical generator 100.

The mount 1 serves to support the primary components of the present invention responsible for generating electricity. It is contemplated that the mount 1 may be embodied by a wide variety of configurations that provide the same functionality. In the preferred embodiment of the present invention, the mount 1 comprises a cylindrical central support member 12 and a plurality of stabilizing legs 13. Each of the plurality of stabilizing legs 13 is connected to the central support member 12, and is angularly and equally distributed around the central support member 12 in order to adequately support the central support member 12 in a vertical orientation. Each of the plurality of stabilizing legs 13 should be adjustable in length in order to accommodate various depths of water. The central support member 12 should be adjustable in height as well by any appropriate and useful means.

In the preferred embodiment of the present invention, the mount 1 further comprises a collar 14 which is concentrically positioned around the central support member 12 and is able to slide axially along the central support member 12, with the inner diameter of the collar 14 being slightly larger than the diameter of the central support member 12. Each of the stabilizing legs 13 is connected to the collar 14 by a hinge. The collar 14 and hinged leg connections provide further height customization for the central support member 12. In an alternate embodiment of the present invention, each of the stabilizing legs 13 is fixed in place relative to the central support member 12. It is desirable in the preferred embodiment for the stabilizing legs 13 to be adjustable and removable, but this is a feature for convenience of use and not paramount to the primary goal of the present invention.

Each of the stabilizing legs 13 should additionally comprise a means to anchor the stabilizing leg into the seabed. In the preferred embodiment of the present invention, each of the stabilizing legs 13 comprises a stabilizing anchor connected to the stabilizing leg opposite the collar 14 along the stabilizing leg 13. The stabilizing anchor can either be a large object, a heavy object, a mechanical fastener, or any combination of the three. For example, the stabilizing anchor may be a concrete pyle, a cement block, or a marine screw, or any other device which facilitates the stabilizing legs 13 being firmly anchored into the seabed.

The pulley support frame 2 is connected to the mount 1. More particularly, the pulley support frame 2 is connected to the central support member 12, axially separated from the plurality of stabilizing legs 13 along the central support member 12. The pulley support frame 2 is connected to the mount 1 by a plurality of fasteners such as, but not limited to, bolts, screws, clasps or any other appropriate fastener. Preferably, the pulley support frame 2 is connected to the mount 1 by three bolts so that the present invention is easy and straightforward to disassemble.

The input axle 7 and the output axle 9 are rotationally connected to the pulley support frame 2, traverse through the pulley support frame 2, and are mounted to the pulley support frame 2 by bearings so that the input axle 7 and the output axle 9 can spin freely within the pulley support frame 2. In the preferred embodiment of the present invention, the input axle 7 and the output axle 9 are oriented perpendicular to the pulley support frame 2.

The float arm 4 is perpendicularly connected to the input axle 7, and the float 3 is connected to the float arm 4 opposite the input axle 7 along the float arm 4. The motion of the float arm 4 is restricted to rotate in a specified angular upstroke direction 41. An upstroke of the float arm 4 is caused by a buoyant force applied to the float 3 by a wave. The float 3 is positioned off-center from the float arm 4 so that the buoyant force produces a torque on the float arm 4 in the specified angular upstroke direction 41. The float arm 4 should be sufficiently long so that the present invention can operate at either high or low tides. The float arm 4 should also be adjustable by any relevant means to adjust for variation in wave height. A longer arm is required for high typical wave height and to prevent the float arm 4 from rotating 180 degrees from the neutral plumb position.

The at least one pulley system 5 is connected to the mount 1 through the input axle 7 and the output axle 9. Each of the at least one pulley system 5 comprises a large input pulley 51 and a small output pulley 52 that are torsionally coupled by a belt 53. The large input pulley 51 and the small output pulley 52 may be channeled pulleys with the belt 53 being a v-belt, or the large input pulley 51 and the small output pulley 52 may be sprockets connected by a chain or perforated belt 53. In the preferred embodiment of the present invention, the large input pulley 51 has a diameter ten times that of the small output pulley 52. However, other implementations and embodiments of the present invention may have different pulley ratios.

The input axle 7 is torsionally and mechanically coupled to the output axle 9 through the at least one pulley system 5, so that motion of the float arm 4 caused by a wave is translated through the at least one pulley system 5 to the output axle 9, resulting in electrical generation. The important aspect of the present invention is to significantly augment the rotational motion at the input axle 7 into a much greater output at the output axle 9. This can conceivably be achieved with one pulley system, with two pulley systems, or more than two pulley systems. The following description is intended to cover each of these cases.

Figure 1:
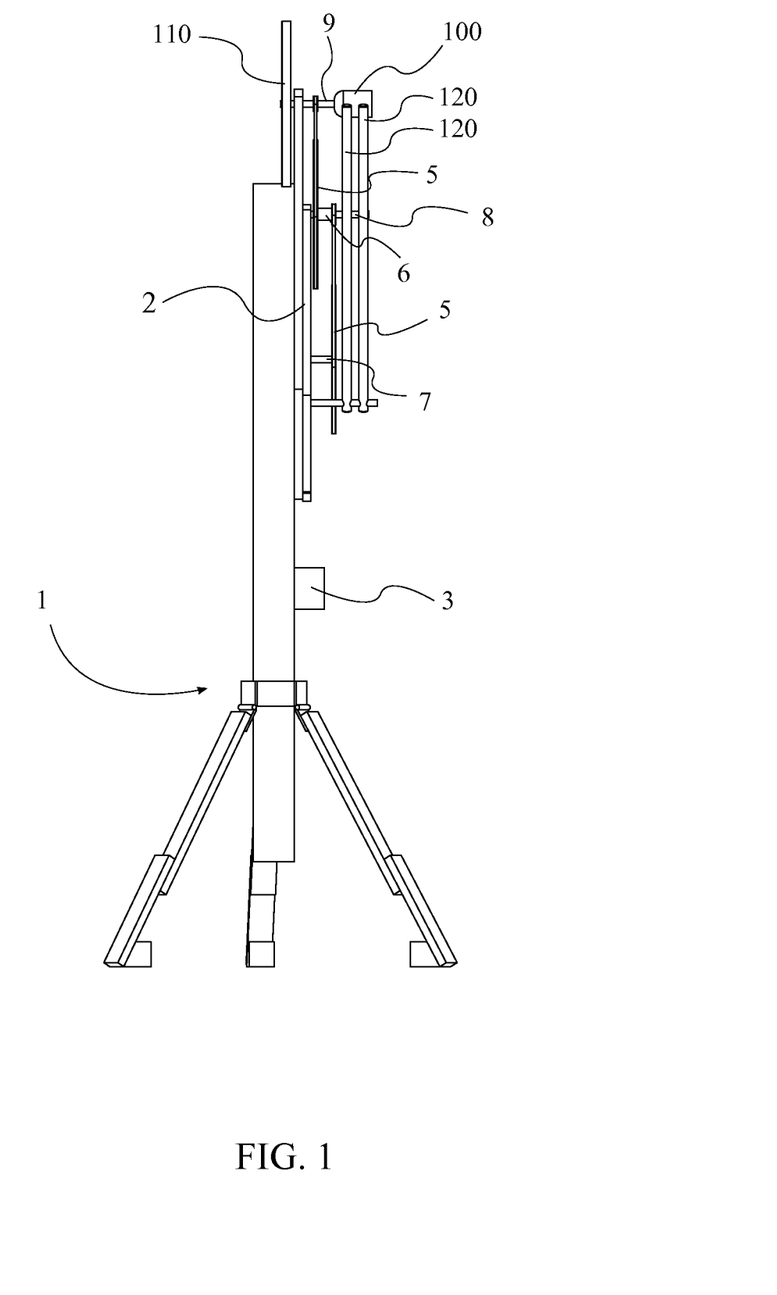
FIG. 1 is a front view of the present invention.
Figure 2:
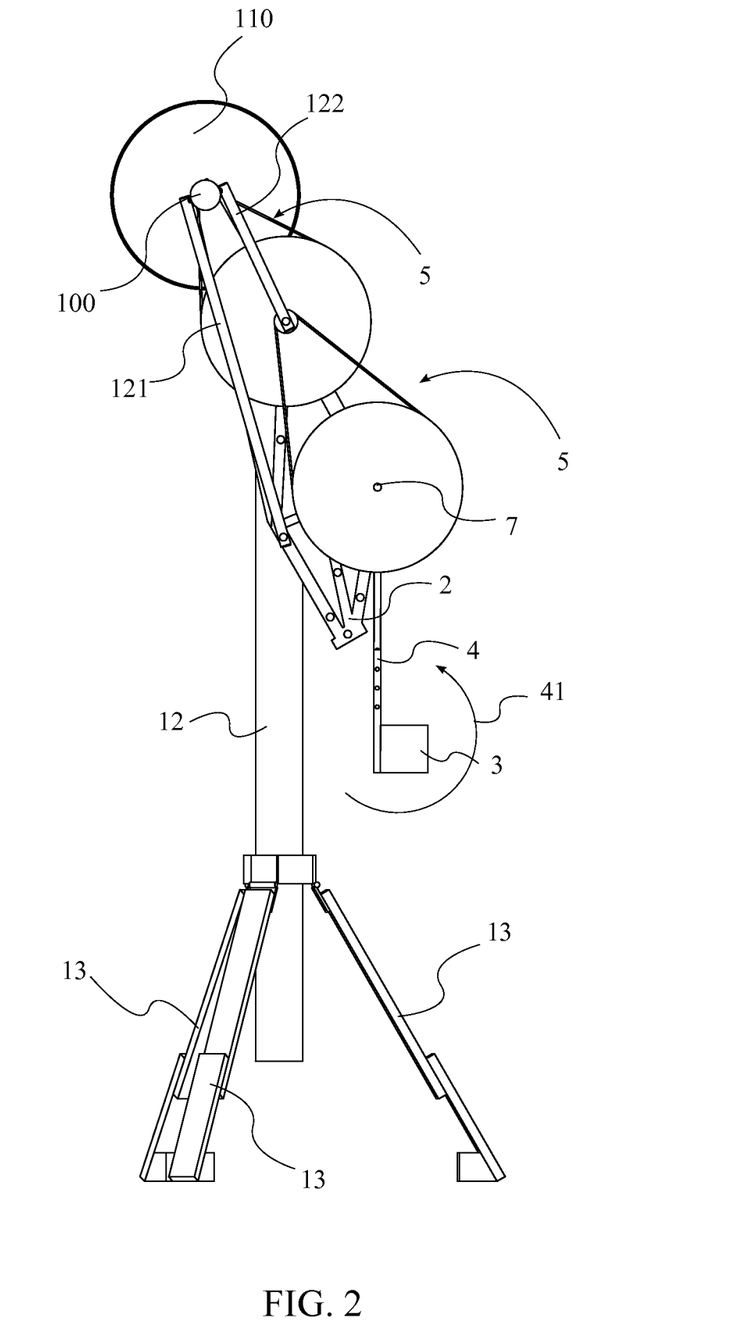
FIG. 2 is a side view of the present invention.
Figure 3:
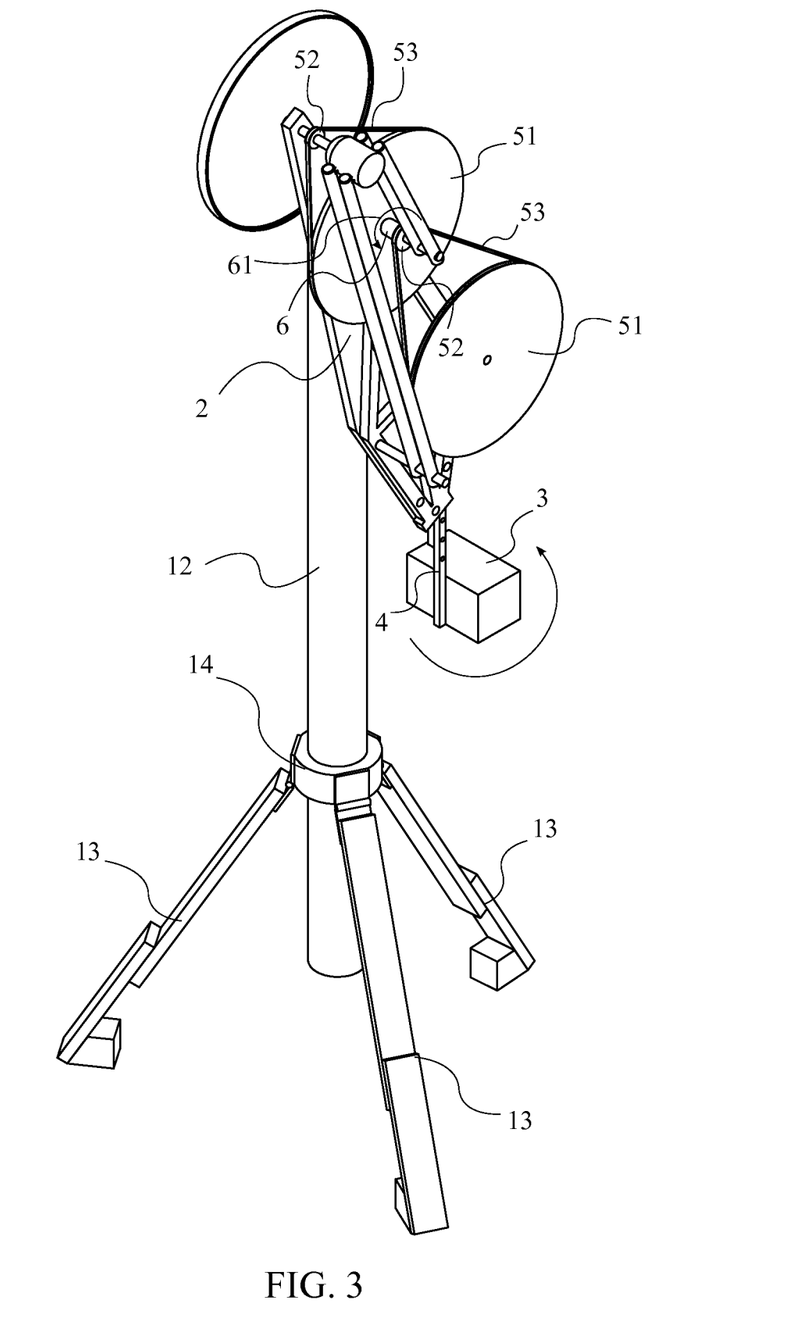
FIG. 3 is a front perspective view of the present invention.
Figure 4:
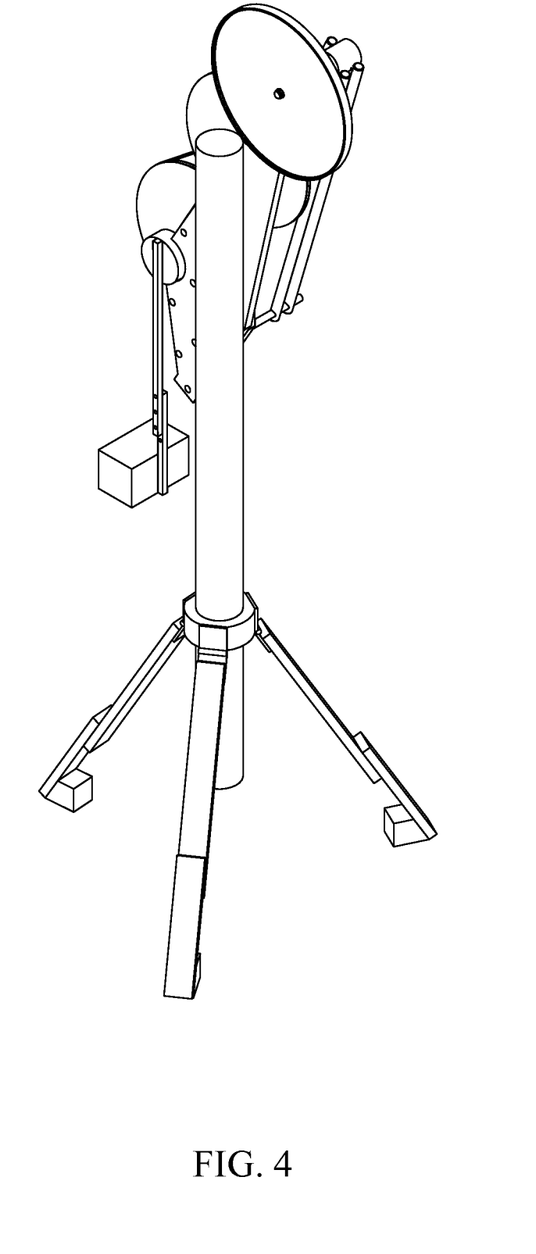
FIG. 4 is a rear perspective view of the present invention.
Figure 5:
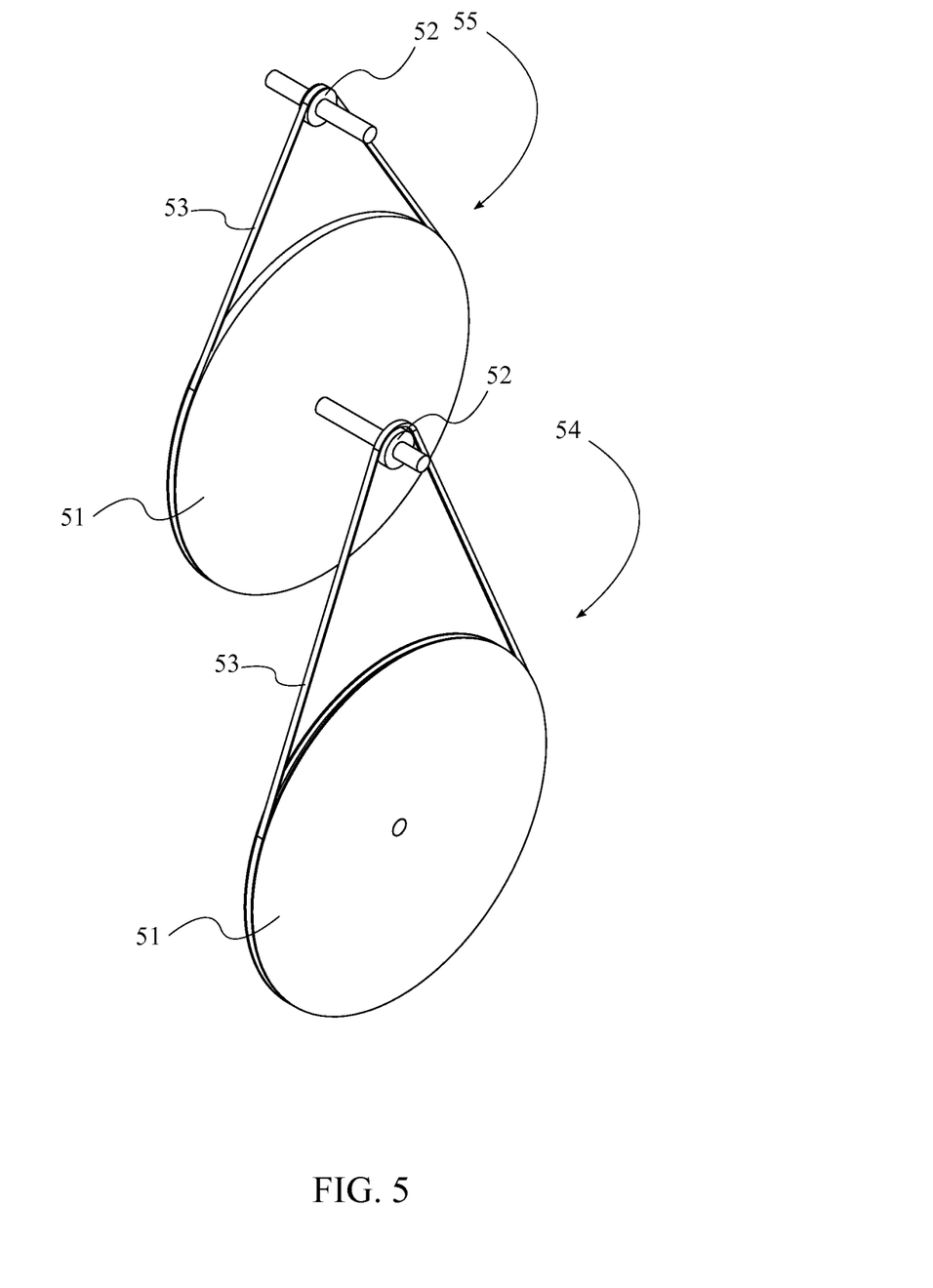
FIG. 5 shows the connection between an arbitrary pulley system and an adjacent pulley system.

To describe the connection between subsequent pulley systems, an arbitrary pulley system 54 and an adjacent pulley system 55 from the at least one pulley system 5 are defined, as illustrated in FIG. 5. The small output pulley 52 of the arbitrary pulley system 54 is axially fixed to the large input pulley 51 of the adjacent pulley system 55, so that the small output pulley 52 of the arbitrary pulley system 54 and the large input pulley 51 of the adjacent pulley system 55 rotate at the same angular speed.

Figure 6:
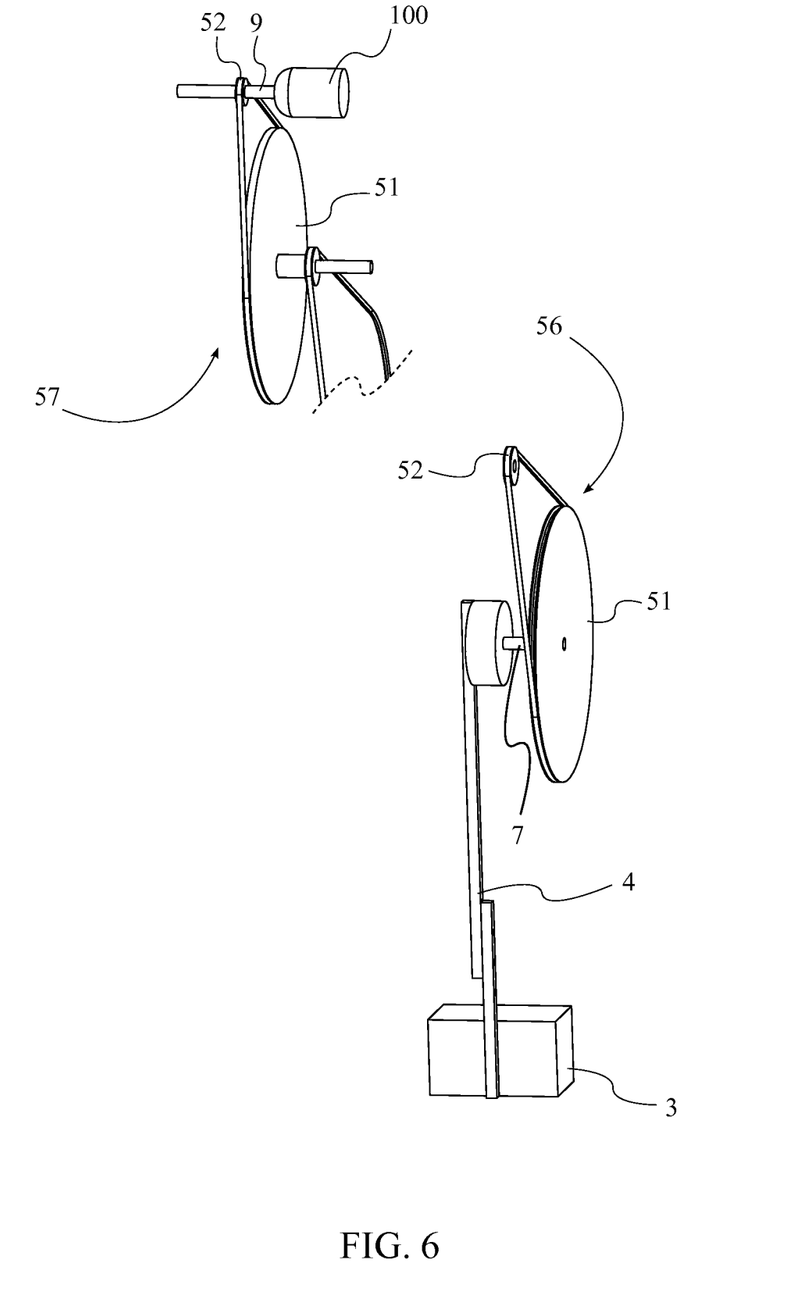
FIG. 6 shows the connection between the input axle and a first pulley system and the connection between a last pulley system and the output axle, with an unspecified number of pulley systems between the first pulley system and the last pulley system.

To describe the power transfer from the input axle 7 through the at least one pulley system 5 to the output axle 9, a first pulley system 56 and a last pulley system 57 from the at least one pulley system 5 are defined, as illustrated in FIG. 6. The large input pulley 51 of the first pulley system 56 is axially fixed to the input axle 7, so that the large input pulley 51 of the first pulley system 56 and the input axle 7 rotate at the same angular speed. The small output pulley 52 of the last pulley system 57 is axially fixed to the output axle 9, so that the small output pulley 52 of the last pulley system 57 and the output axle 9 rotate at the same angular speed.

The preferred embodiment of the present invention utilizes two pulley systems. In this preferred embodiment, the first pulley system 56 is the arbitrary pulley system 54, and the last pulley system 57 is the adjacent pulley system 55. Therefore, in the preferred embodiment, the small output pulley 52 of the first pulley system 56 is axially fixed to the large input pulley 51 of the last pulley system 57. Additionally, the small output pulley 52 of the first pulley system 56 and the large input pulley 51 of the last pulley system 57 are axially fixed to an intermediate axle 8, which is rotationally connected to the pulley support frame 2 in a similar manner to the input axle 7 and the output axle 9. In this preferred embodiment, with two pulley systems each having a 10:1 ratio, one upstroke of the float arm 4 producing a quarter turn of the input axle 7 results in 25 revolutions of the output axle 9. The intermediate axle 8 does not exist in the embodiment with only one pulley system. The intermediate axle 8 is present in order to facilitate the connection between adjacent pulley systems. More than two pulley systems would require more than one intermediate axle 8.

In an alternate embodiment, for example, which comprises four pulley systems, the fourth pulley system is the last pulley system. In this embodiment, the arbitrary pulley system could describe either the first, second or third pulley system, with the adjacent pulley system describing the second, third or fourth pulley system, respectively.

The output axle 9 is rotationally connected to the electrical generator 100, and serves as a drive shaft for the electrical generator 100. Rotation of the output axle 9 results in electricity being generated by the electrical generator 100. In the preferred embodiment of the present invention, the electrical generator 100 is an alternator. More specifically, the electrical generator 100 is a Windblue Power DC-540 Low Wind permanent Magnet Alternator, though any useful and appropriate generator may be utilized as applicable.

The ratchet gear 6 is rotationally connected to one of the at least one pulley system 5, and a forward direction 61 of the ratchet gear 6 is angularly opposite to the angular upstroke direction 41, so that the output axle 9 is turned by an upstroke of the float arm 4, but effects of the motion of the float arm 4 on the system are disengaged on the downstroke of the float arm 4 so that the output axle 9 continues to rotate and does not change angular direction. The ratchet gear 6 may be positioned at any axle of the present invention, but in the preferred embodiment the ratchet gear 6 is connected to the intermediate axle 8.

The preferred embodiment of the present invention further comprises a flywheel 110 to store rotational energy and keep the rotation of the pulley system and axles as consistent as possible while the float arm 4 is on a downstroke. The flywheel 110 is rotationally connected to one of the at least one pulley system 5. The flywheel 110 may theoretically be positioned on any of the input axle 7, the intermediate axle 8, or the output axle 9, so long as the flywheel 110 is located after the ratchet gear 6 in the power train from the input axle 7 to the output axle 9. However, in the preferred embodiment the flywheel 110 is axially fixed to the output axle 9. Additionally, with the output axle 9 traversing through the pulley support frame 2, the flywheel 110 should be positioned adjacent to the pulley support frame 2 opposite the electrical generator 100 in order to provide a modicum of balance to the present invention.

An additional feature comprised in the preferred embodiment is a plurality of generator support members 120 which are connected to the electrical generator 100 in order to provide structural support and aid in holding the electrical generator 100 in place. The plurality of generator support members 120 may be connected between the electrical generator 100 and any other location on the present invention which aid in providing structural support members. However, in the preferred embodiment a first set of support members 121 from the plurality of generator support members 120 is connected between the electrical generator 100 and the pulley support frame 2, and a second set of support members 122 from the plurality of generator support members 120 is connected between the electrical generator 100 and the intermediate axle 8.

The present invention is very simple, cheap to build, and portable. The present invention can be homemade without special skills using off-the-shelf components. The means of capturing wave power appears unique in its simplicity and cheapness, and therefore accessibility to those of limited financial means. The present invention is used to provide a cheap source of electricity to those who are without it, particularly in poorer parts of the world. The wave energy conversion mechanism is ideal for those living on islands in lakes or oceans, or near shorelines without access to electric power. It is lightweight, allowing it to be easily built offsite and transported. The simplicity of mechanism requires no special skills or education to build. Materials are readily available anywhere. The present invention's cheapness (under $500 to construct) puts it financially within reach of all, including low income or third world families.

Although the invention has been explained in relation to its preferred embodiment, it is to be understood that many other possible modifications and variations can be made without departing from the spirit and scope of the invention as hereinafter claimed.

What is claimed is:

1. A wave energy convertor comprises: a mount; a pulley support frame; a float; a float arm; at least one pulley system; a ratchet gear; an input axle; an output axle; an electrical generator; the pulley support frame being connected to the mount; the input axle, the output axle being rotationally connected to the pulley support frame; the at least one pulley system being connected to the mount through the input axle and the output axle; each of the at least one pulley system comprises a large input pulley and a small output pulley; the large input pulley being torsionally coupled to the small output pulley by a belt; the float arm being perpendicularly connected to the input axle; the float being connected to the float arm opposite the input axle; the float arm being restricted to a specified angular upstroke direction, wherein an upstroke is caused by a buoyant force applied to the float by a wave; the output axle being rotationally connected to the electrical generator; the input axle being torsionally and mechanically coupled to the output axle through the at least one pulley system; the ratchet gear being rotationally connected to one of the at least one pulley system; a forward direction of the ratchet gear being angularly opposite to the angular upstroke direction.

2. The invention as claimed in claim 1 comprises: the mount comprises a central support member and a plurality of stabilizing legs; the plurality of stabilizing legs being connected to the central support member; the pulley support frame being connected to the central support member.

3. The invention as claimed in claim 2 comprises: the plurality of stabilizing legs being equally angularly distributed around the central support member, wherein the plurality of stabilizing legs support the central support member in a vertical orientation.

4. The invention as claimed in claim 2 comprises: each of the plurality of stabilizing legs being adjustable in length.

5. The invention as claimed in claim 2 comprises: the mount comprises a collar; the collar being concentrically positioned around the central post, wherein the collar is able to slide axially along the central post; each of the stabilizing legs being connected to the collar.

6. The invention as claimed in claim 2 comprises: the pulley support frame being axially separated from the plurality of stabilizing legs along the central support member.

7. The invention as claimed in claim 1 comprises: the float being positioned off-center from the float arm, wherein the off-center position of the float from the float arm results in a torque being applied to the float arm in the specified angular direction when a buoyant force is applied to the float by a wave.

8. The invention as claimed in claim 1 comprises: an arbitrary pulley system and an adjacent pulley system from the at least one pulley system; the small output pulley of the arbitrary pulley system being axially fixed to the large input pulley of the adjacent pulley system.

9. The invention as claimed in claim 1 comprises: a first pulley system and a last pulley system from the at least one pulley system; the large input pulley of the first pulley system being axially fixed to the input axle; the small output pulley of the last pulley system being axially fixed to the output axle.

10. The invention as claimed in claim 9 comprises: the small output pulley of the first pulley system being axially fixed to the large input pulley of the last pulley system.

11. The invention as claimed in claim 9 comprises: the small output pulley of the first pulley system and the large input pulley of the last pulley system being axially fixed to an intermediate axle; the intermediate axle being rotationally connected to the pulley support frame.

12. The invention as claimed in claim 1 comprises: the large input pulley having a diameter ten times that of the small output pulley.

13. The invention as claimed in claim 1 comprises: a flywheel; the flywheel being rotationally connected to one of the at least one pulley system.

14. The invention as claimed in claim 13 comprises: the flywheel being axially fixed to an intermediate axle.

15. The invention as claimed in claim 13 comprises: the flywheel being axially fixed to the output axle.

16. The invention as claimed in claim 15 comprises: the output axle traversing through the pulley support frame; the flywheel being positioned adjacent to the pulley support frame opposite the electrical generator.

17. The invention as claimed in claim 1 comprises: a plurality of generator support members; each of the plurality of generator support members being connected to the electrical generator.

18. The invention as claimed in claim 17 comprises: the plurality of generator support members comprises a first set of support members and a second set of support members.

19. The invention as claimed in claim 17 comprises: the first set of support members being connected to the pulley support frame.

20. The invention as claimed in claim 17 comprises: the second set of support members being connected to an intermediate 30 axle.

\* \* \* \* \*